June 21, 1932. E. H. CURTIS, JR 1,864,187
CAM AND ITS MOUNTING FOR A GLASS FEEDER
Original Filed Feb. 8, 1928   2 Sheets-Sheet 1
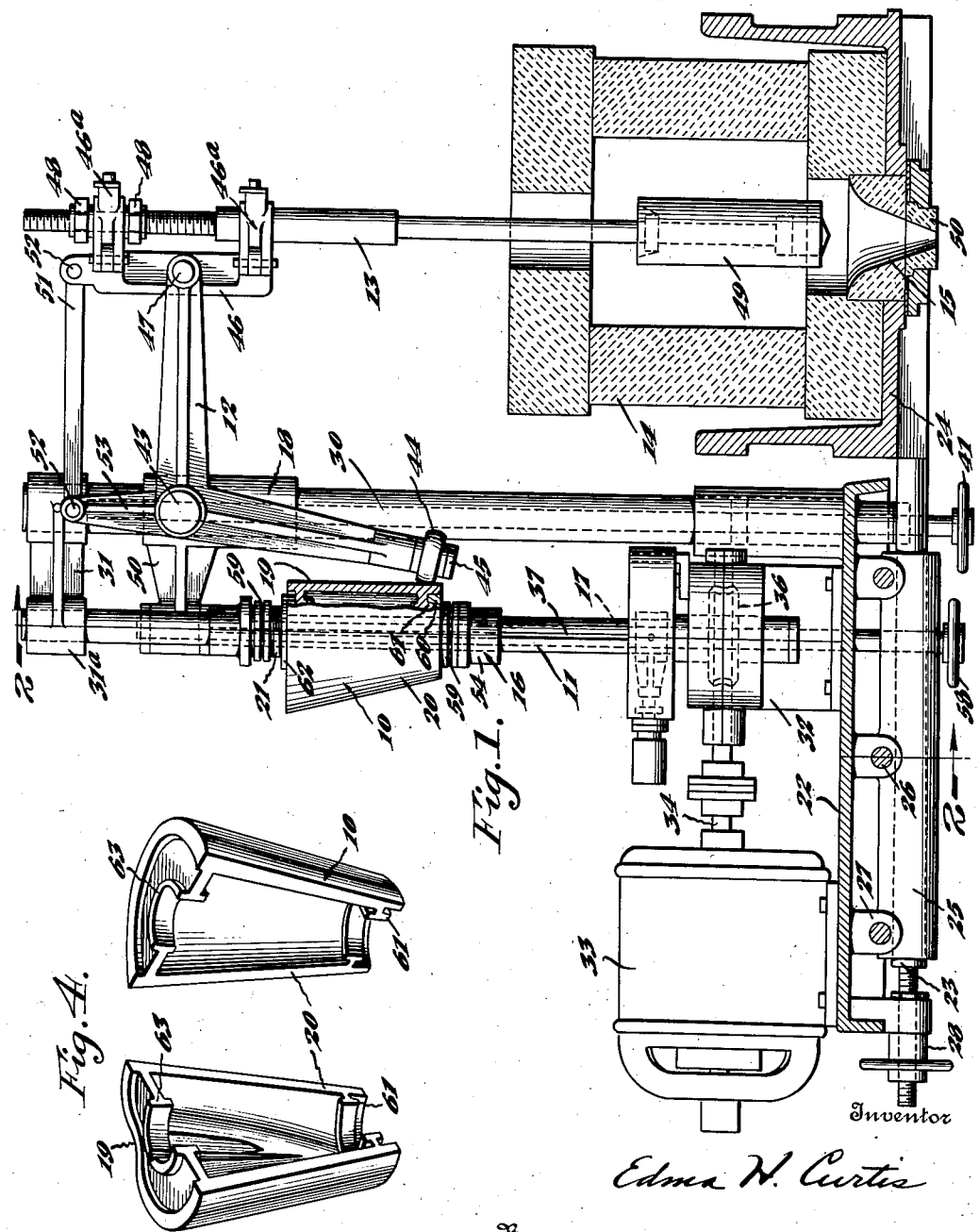

June 21, 1932. E. H. CURTIS, JR 1,864,187
CAM AND ITS MOUNTING FOR A GLASS FEEDER
Original Filed Feb. 8, 1928  2 Sheets-Sheet 2
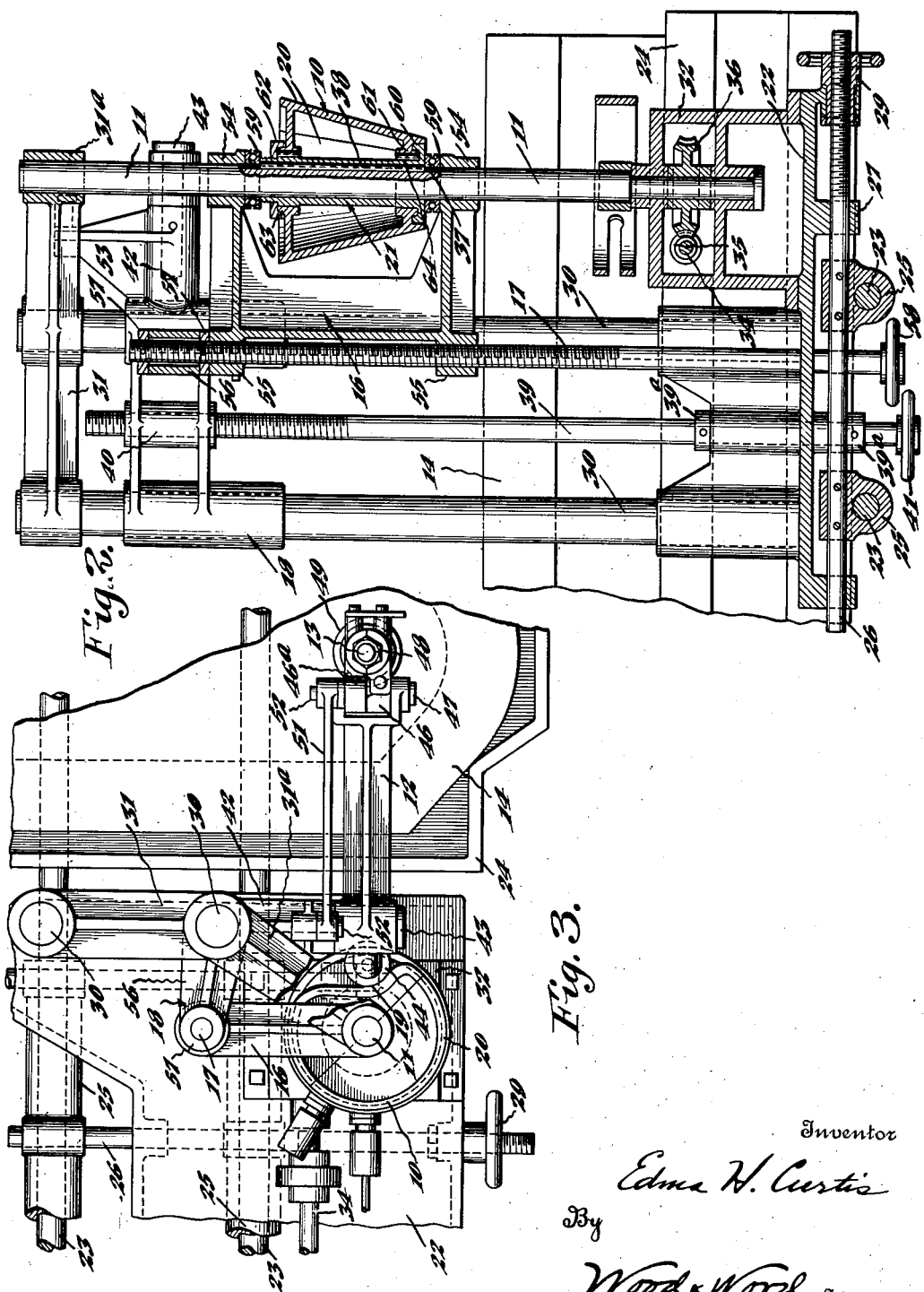
Inventor
Edna H. Curtis
By
Wood & Wood Attorneys Patented June 21, 1932

1,864,187

UNITED STATES PATENT OFFICE

EDMA H. CURTIS, JR., OF CINCINNATI, OHIO, ASSIGNOR, BY MESNE ASSIGNMENTS, TO GENERAL GLASS CORPORATION, OF LANCASTER, OHIO, A CORPORATION OF OHIO

CAM AND ITS MOUNTING FOR A GLASS FEEDER

Original application filed February 8, 1928, Serial No. 252,882. Divided and this application filed January 16, 1930. Serial No. 421,288.

This invention relates to motion transmission and is particularly directed to a cam for imparting motion in strokes of arbitrarily variable length. The invention is also directed to the mounting for and driving connection to the cam.

The cam of this invention was disclosed in and is divisional of a copending application of Edma H. Curtis, Jr., Serial No. 252,882, filed on February 8, 1928 for "apparatus for feeding molten glass". The cam is therefore illustrated in the environment of a glass feeder and is utilized in this instance as a feeder for reciprocating a plunger through the medium of a swinging lever. The plunger type feeder employs the plunger moving in molten glass to force glass through an orifice at the bottom of the container by downward plunge, the measured gob displaced through and depending from the orifice being severed after each plunge. The cam, although disclosed in this environment to illustrate a use of the variable stroke feature, is designed for general utility and the present invention, therefore, entirely contemplates the cam, its mounting in an adjustable support, and its driving connection to a shaft.

It is an object of this invention to provide a cam of the form of an eccentric truncated cone, which may, by shifting the same along its axis of rotation and relative to the element to which motion is imparted, move the element in strokes of various lengths.

Another object is to provide an improved cam construction and a support or journal and driving element for the cam whereby the cam is rapidly and conveniently mounted whenever replacement or exchange of cams is necessary.

Other objects and certain advantages will be more fully set forth in a description of the accompanying drawings, in which:

Figure 1 is a general view or side elevation of a glass machine including the cam and mounting of the present invention, certain portions of the cam and machine being broken away to more fully illustrate the parts.

Figure 2 is a sectional view taken on line 2—2, Figure 1, illustrating the cam and its adjustable support in section and showing the relation of these parts to the driving mechanism.

Figure 3 is a fragmentary top plan view of the machine wherein a portion of the cross head is broken away to illustrate the cam.

Figure 4 is a perspective view of the cam sections showing these parts separated and removed from the driving sleeve.

The cam 10 is shown slidably mounted upon a driving shaft 11 of a glass feeder and in engagement with one arm of a bell crank lever 12. The other arm of the bell crank lever has a glass feeding plunger 13 hung thereon so that the rotating cam 10 in this instance imparts a swinging motion to the bell crank lever 12 and a lineal motion to the plunger 13. The plunger moves within a container 14 to displace the glass through an orifice 15. The cam is journalled within an adjustable bracket 16 having screw-threaded engagement with an adjusting screw 17 rotatably hung in a vertically adjustable support 18 on which the bell crank lever is pivoted. Rotation of the screw 17 moves the cam 10 along its axis of rotation and disposes various portions of the periphery of the cam against the arm of the bell crank lever.

The cam has the characteristics of an eccentric truncated cone with a longitudinal extent 19 thereof disposed parallel to the axis of the cone. When this portion of the cam is engaged by the lever, the plunger is at the lower limit of its strokes which limit is therefore standard throughout the length of the cam. The frustro-conical cam which is inverted in this instance imparts strokes of variable length to the plunger varying from a short stroke imparted by the head end to a relatively long stroke imparted by its base. The provision of the axially aligned longitudinal extent 19 and the diametrically opposite true conical extent gives a regularly axially varying eccentric periphery to the cam.

The cam is made up of sections 20—20 which mate axially and which are secured upon a driving sleeve 21 splined to the shaft 11. The driving sleeve 21 is disposed between fixed journal or bearing portions of the cam support 16 through which the shaft is rotatively disposed and the cam sections are laterally brought into position thereon in assembly of the cam.

A platform 22 is provided for supporting the entire glass feeding mechanism. This platform is mounted on a pair of rods 23—23 extending laterally from the snout 24 which supports the container 14 of the feeder. The mounting of the platform upon these rods consists of sleeves 25 slidably mounted on the rods and transversely extending rods 26 tangentially traversing the sleeves 25 and secured therein, the platform having lugs 27 slidably traversed by the last mentioned rods (see Figure 2). The platform is moved on the main support rods 23—23 by means of hand wheels 28 rotatably journalled in the platform and having screw-threaded connection on the ends of the rods, the opening in the platform in which the hand wheel is journalled being in the form of a horizontal slot (not shown) for permitting lateral movement of the platform. The platform is slid on the transverse rods 26 by means of hand wheels 29 having screw-threaded connection with the ends of the rods 26 and rotatably journalled in the platform. By these slidable supports for the platform it is possible to adjust the plunger which is hung from the platform over the orifice to properly position the same in axial alignment with the orifice.

A standard is mounted on the platform, comprising a pair of posts 30—30 spaced apart and secured at the lower ends in the platform and at the upper ends by means of a cross head 31, the posts extending into and pinned to the cross head. An arm 31ª extends from the cross head in which arm the upper end of the cam driving shaft 11 is journalled. The lower end of the cam driving shaft is journalled and supported within a transmission casing 32 secured on the platform.

The motive power for the shaft is provided by a motor 33 bolted on the platform and having its shaft 34 in transmission connection with the lower end of the cam driving shaft by means of a worm 35 on the motor shaft 34 and a gear 36 on the driving shaft 11. The cam shaft 11 has a key slot 37 extending throughout its length in which slot is disposed the key 38 carried by the driving sleeve 21 of the cam which sleeve surrounds the shaft.

The vertically slidable support 18 provides a double bearing through slidable connection to both of the posts of the standard, this insuring the proper stability for the support since it carries the major portion of the mechanism. Inasmuch as the plunger 13 is hung from this support, the support is made adjustable for adjusting the plunger relative to the orifice by means of a screw 39 rotatively journalled in the platform at its lower end and supported by means of spaced collars 39ª—39ª pinned to the shaft above and below the platform. The upper end of the screw is threaded through a boss 40 of the support. A hand wheel 41 is provided on the lower end of the screw below the platform whereby the screw may be rotated to raise or lower the lever and cam support 12 and vary the limits of stroke of the plunger relative to the orifice. A boss 42 protrudes from one side of the support radially relative to the post 30 and a pivot pin 43 is secured therein pivotally mounting the bell crank lever. The downwardly extending arm of the bell crank lever carries a roller 44 held in place on the end of the lever by means of a screw 45 extending into the end of the arm, this roller engaging the cam. The other arm of the lever has the coupling bracket 46, carrying the plunger, fulcrumed thereon by means of a pin 47.

The coupling bracket 46 provides a pair of vertically spaced apart bearings 46ª in which the plunger 13 is vertically mounted. These bearings are of split type, each having a hinged section held in closed position by means of a latch. The lower bearing merely encircles the plunger to maintain it against lateral movement, whereas a pair of nuts 48—48 are provided respectively above and below the upper bearing of the screw-threaded upper end of the plunger for supporting the plunger in vertically adjustable position. The plunger is provided with a clay head 49 of the proper size for efficient displacement of glass through the orifice 15. The glass container is fabricated of clay blocks supported in the trough-like snout 24 and the orifice is formed in a clay flow ring 50 suitably supported in the snout.

A stabilizing or equalizing link 51 connects the coupling bracket 46 and the support. This link is pivotally attached to the standard 53 of the bracket and to the support by means of pins or screws 52 and is in parallelism with the arm of the bell crank lever and spaced apart therefrom.

It will be seen that a parallelogram is formed, the corners of which are represented by the pivot points of the arm and link and the inner side of which, represented by the standard 53 of the support, is fixed in its vertical relation. The plunger therefore is maintained in parallelism with the standard regardless of the swinging of the arm and there can be no vertical disalignment of the plunger.

The cam 10 of this invention is mounted on the driving shaft between fixed spaced bearings 54—54 of the yoke-shaped journal bracket 16. This journal bracket or frame also provides fixed spaced bearings or bosses 55 through which the screw 17 is engaged in screw-threaded connection, this screw being vertically hung on an extending arm 56 of the cam and lever support.

The upper end of the screw 17 loosely traverses the arm 56 and has a pair of collars 57—57 pinned thereto above and below the arm, these maintaining the screw against axial displacement. The screw extends below the platform and is provided with a hand wheel 58 for rotating the same in the upper bearing and vertically moving the journal frame. Vertical movement of the journal frame slides the frame and cam on the drive shaft, the fixed bearings thereof being traversed by the shaft.

The driving sleeve 21 keyed or splined to the shaft 11 is disposed between a pair of ball bearings 59—59 abutting the respective fixed bearings 54—54 of the journal frame and therefore slides on the shaft when the support or bracket is adjusted. The cam as previously described is made up of half sections 20—20 which mate in an axial plane and which are attached to the sleeve. The sleeve has an annular upturned flange 60 formed at its lower end, the upturned portion of this flange adapted to surround a tapered hub 61 of the joined half sections. The inner wall of the upturned flange on the sleeve is tapered downwardly and inwardly to correspond to the taper of the hubs of the sections for drawing the sections snugly against the sleeve.

A similar arrangement is provided at the upper end of the sleeve, but the annular flange corresponding to the lower flange of the sleeve is oppositely disposed and is in the form of a nut 62 screw-threaded on the sleeve, the inner wall of this nut having a tapered engagement with a tapered hub 63 formed on the sections whereby the sections are urged inwardly against the sleeve when the nut is tightened. Clearance is provided between the nut and ball bearing 59 whereby the nut may be unscrewed sufficiently to permit lateral removal of the cam sections.

The cam sections are keyed to the sleeve to prevent rotation relative thereto by short keys 64 in key slots of the hubs of the cam sections and the sleeve. Therefore the cam is slidably keyed to the shaft through the sleeve and is supported between ball bearings in an adjustable frame. Adjustment of the frame slides the cam axially on the drive shaft and the engagement of the lever which is actuated is changed longitudinally of the cam for a change of stroke as determined by the periphery of the cam at the particular point or plane of engagement. The roller carrying arm of the bell crank lever is urged against the cam by the weight of the plunger and the plunger mounting. The frustro-conical design of the cam with the eccentric contour thereof varying longitudinally provides any suitable range of length for plunger stroke.

The general combination of glass feeder elements as shown and described in this case is herewith reserved as subject matter for claims in the previously mentioned co-pending application of Edma H. Curtis, Jr., Serial No. 252,882, filed on February 8, 1928.

Having described my invention, I claim:

1. A cam, comprising, axially abutting sections, and a driving sleeve about which said sections are centered and secured, said sleeve having opposing flanges axially adjustably spaced apart and engageable upon and around the respective ends of the joined cam sections for clamping the sections in position against longitudinal and lateral displacement.

2. A cam, comprising, a driving sleeve, cam sections mating in axial plane about the driving sleeve, an annular axially turned flange formed at one end of the driving sleeve, a retaining nut having an axially disposed annular flange formed thereon and opposing the first flange, said nut screwed onto the opposite end of the sleeve, tapered hubs formed outwardly from each end of the joined cam sections, said nut and flange on the sleeve having correspondingly tapered surfaces engaging upon the hubs of the cam sections for rigidly clamping the sections on the sleeve.

3. A cam mounting of the class described, comprising, a driving shaft, a support, a cam bracket adjustably hung from said support, said cam bracket having a pair of fixed bearings through which the driving shaft is rotatively disposed, and a cam journalled between the fixed bearing portions and keyed to the driving shaft.

4. In a glass feeder, a driving shaft, a support, a cam bracket, a screw rotatably hung in said support and screw-threaded through said cam bracket, said cam bracket having a pair of fixed spaced bearings through which the driving shaft passes, a driving sleeve keyed to said shaft and journalled between said fixed bearings of the bracket, and cam sections fixed to said sleeve and laterally removable therefrom whereby the cam may be removed without withdrawing the driving shaft from the bracket.

5. In a glass feeder, a driving shaft, a vertically adjustable support, a cam bracket, a screw rotatably hung in said support and screw-threaded through said cam bracket, said cam bracket having a pair of fixed spaced bearings through which the driving shaft passes, a driving sleeve keyed to said shaft and journalled between said fixed bearings of the bracket, said sleeve having opposingly related axially disposed flanges at the respective ends thereof, one adjustable toward the other, and cam sections fixed to said sleeve and having hubs encircled by said flanges whereby the cam sections are securely held in position about the sleeve and against lateral displacement by forcing the flanges against the hubs.

In witness whereof, I hereunto subscribe my name.

EDMA H. CURTIS, Jr.